US009292945B2

(12) United States Patent
Kubota

(10) Patent No.: US 9,292,945 B2
(45) Date of Patent: Mar. 22, 2016

(54) PROJECTOR, IMAGE DISPLAY SYSTEM, AND METHOD OF CONTROLLING PROJECTOR

(71) Applicant: SEIKO EPSON CORPORATION, Tokyo (JP)

(72) Inventor: Shinji Kubota, Ina-shi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 311 days.

(21) Appl. No.: 13/920,521

(22) Filed: Jun. 18, 2013

(65) Prior Publication Data

US 2013/0342576 A1 Dec. 26, 2013

(30) Foreign Application Priority Data

Jun. 22, 2012 (JP) ................................. 2012-141290

(51) Int. Cl.
*H04N 5/74* (2006.01)
*G06T 11/00* (2006.01)
*H04N 3/19* (2006.01)
*G09G 5/00* (2006.01)
*G09G 3/00* (2006.01)
*H04N 9/31* (2006.01)

(52) U.S. Cl.
CPC .............. *G06T 11/003* (2013.01); *G09G 3/002* (2013.01); *G09G 5/00* (2013.01); *H04N 3/19* (2013.01); *H04N 5/74* (2013.01); *H04N 9/3147* (2013.01); *H04N 9/3185* (2013.01); *H04N 9/3194* (2013.01)

(58) Field of Classification Search
CPC ......... H04N 5/74; H04N 3/19; H04N 9/3185; G09G 5/00
USPC ........................... 353/30, 69, 70, 94; 348/745
See application file for complete search history.

(56) References Cited

U.S. PATENT DOCUMENTS

| 6,932,481 | B2 * | 8/2005 | Koyama et al. ................ 353/94 |
| 8,550,635 | B2 * | 10/2013 | Kotani ............................ 353/94 |
| 2008/0309884 | A1 * | 12/2008 | O'Dor et al. ...................... 353/7 |
| 2009/0073393 | A1 * | 3/2009 | Lee et al. ........................ 353/94 |
| 2013/0250251 | A1 * | 9/2013 | Kubota ............................ 353/57 |
| 2014/0111536 | A1 * | 4/2014 | Shinozaki ..................... 345/589 |

FOREIGN PATENT DOCUMENTS

JP B2-4168024 10/2008

* cited by examiner

*Primary Examiner* — William C Dowling
(74) *Attorney, Agent, or Firm* — Oliff PLC

(57) ABSTRACT

An image display system includes a first projector and a second projector, and makes the first projector and the second projector operate in cooperation with each other to form a single projection image on a common screen. The first projector and the second projector are connected to each other via a signal line. A master control section of the first projector transmits a control signal to a subordinate control section of the second projector. The subordinate control section of the second projector controls a projection section of the second projector based on the control signal. Thus, the controllability of the image display system provided with a plurality of projectors is enhanced.

7 Claims, 10 Drawing Sheets

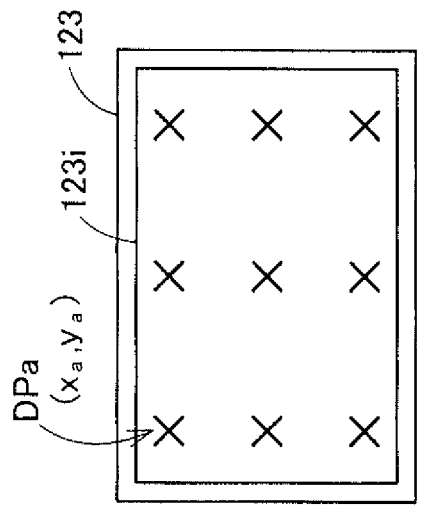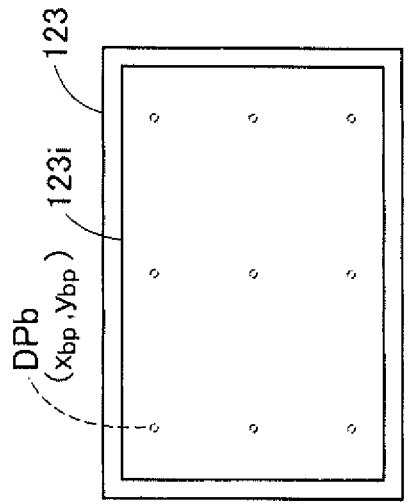
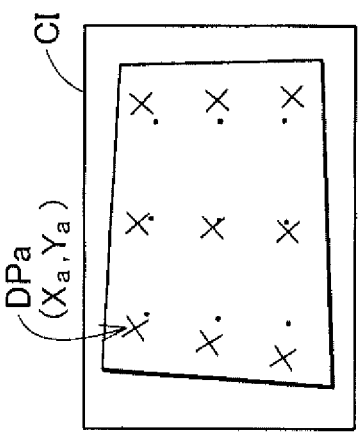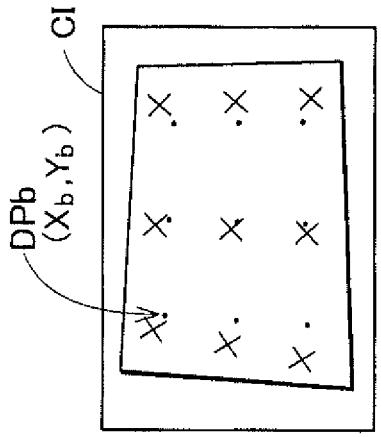
FIG. 8A
FIG. 8B

PROJECTOR, IMAGE DISPLAY SYSTEM, AND METHOD OF CONTROLLING PROJECTOR

The entire disclosure of Japanese Patent Application No. 2012-141290, filed Jun. 22, 2012 is expressly incorporated by reference herein.

BACKGROUND

1. Technical Field

The present invention relates to a projector.

2. Related Art

There is known a technology called stack projection of making projection images of a plurality of projectors overlap each other on a common screen to thereby form a single projection image. The stack projection is used in, for example, the case of forming a three-dimensional image with a plurality of projectors, and the case of forming a projection image with high luminance. In the stack projection, in order to improve the image quality of the projection image thus formed, it is required to overlap a plurality of projection images with each other with high accuracy.

In order to cope with this requirement, in the technology of Japanese Patent No. 4,168,024 (Document 1), the stack projection is realized by performing the following correction process. In the technology of Document 1, tow projectors are made to alternately perform projection of coordinate pattern images, and a common measurement camera is made to capture the projection image of each of the coordinate pattern images under the control of a control device. The control device performs the process of calculating correction data of each of the projectors using the captured image.

Here, in the technology of Document 1, since each of the projectors is separately made to perform display of the coordinate pattern image, complicated control by the control device for making the projectors work with each other is required, and there is a possibility that the system grows in size, and the control thereof becomes complicated. Further, in the technology of Document 1, since the correction is separately performed for each of the projectors, the number of processes for the correction and the processing time thereof are dramatically increased, and there is a possibility that the processing efficiency is decreased.

Incidentally, in a image display system for displaying an image with a plurality of projectors cooperating with each other such as the image display system for performing the stack projection, it is generally required to be able to more easily and efficiently perform the coordination control to thereby improve the controllability of the system. Further, in such an image display system, since there is a possibility that the positional relationship between the projectors varies with time, it is also required to be able to more easily and promptly perform a correction process, such as a stack correction, for correcting a shift between the projection images.

Further, due to the spread of picture medium using a three-dimensional image and the diversity of picture media, miniaturization and generalization of the configuration, cost reduction, resource saving, facilitation of production, enhancement of convenience (usability), and so on are required for the image display system described above and the projector constituting the system.

SUMMARY

An advantage of some aspects of the invention is to solve at least a part of the problems described above, and the invention can be implemented as the following aspects.

(1) One aspect of the invention provides a projector. The projector includes a projection section adapted to display a projection image, which is to be combined with a projection image of another projector, by projection on a projection surface, and a control section adapted to control the projection section, and to transmit a control signal adapted to control the projection of the another projector to the another projector. According to the projector of this aspect of the invention, it is possible to command another projector to operate in cooperation with itself by transmitting the control signal to another projector. Therefore, it is possible to enhance the controllability of the image display system for operating a plurality of projectors in cooperation with each other.

(2) The projector of the above aspect of the invention may be configured such that the projector further includes an operation section adapted to receive an operation by a user, and in response to receiving the operation by the user, the control section controls the projection section in accordance with the operation by the user, and transmits the control information corresponding to the operation by the user to another projector. According to the projector of this aspect of the invention, the projection display process corresponding to the operation by the user can be performed while making another projector operate in cooperation with the projector.

(3) The projector of the above aspect of the invention may be configured such that the projector further includes an image capturing section adapted to capture the projection surface on which the projection image of the another projector is displayed, and generates a captured image, and an image correction section adapted to correct an image to be a projection object of the projection section based on a projection image, which is displayed by the another projector based on the control signal, and is included in the captured image, the control section (i) transmits a control signal adapted to command projection display of a reference image to be a reference of a correction to the another projector, (ii) makes the image capturing section obtain the captured image including a taken image of the projection image including projection of the reference image, and (iii) makes the image correction section perform the correction based on the captured image including the taken image of the projection image including the projection of the reference image. According to the projector of this aspect of the invention, the correction to be performed in cooperation with another projector can easily be performed.

(4) Another aspect of the invention provides a projector. The projector includes a projection section adapted to project an image based on an image signal on a projection surface, and a control section adapted to receive a control signal from another projector, and to control the projection section based on the control signal. According to the projector of this aspect of the invention, since the projection display can be performed in cooperation with another projector, the image display system with high controllability can be configured.

(5) The projector of the above aspect of the invention may be configured such that the control signal is a command signal adapted to make the projection section project an image to be combined with a projection image projected by the another projector. According to the projector of this aspect of the invention, since the projection image to be combined with the projection image of another projector can be projected in cooperation with another projector, the image display system with high controllability can be configured.

(6) The projector of the above aspect of the invention may be configured such that the control signal includes a command signal adapted to make the projection section project an image to be a reference of a correction of the projection image projected by the another projector. According to the projector of this aspect of the invention, since the image to be the reference of the correction of another projector is projected in accordance with the command of another projector, it becomes easy to perform the correction process to be performed in cooperation with another projector.

(7) The projector of the above aspect of the invention may be configured such that the projection section includes a plurality of signal terminals adapted to externally receive supply of a plurality of types of image signals, and an input signal switching section adapted to switch the signal terminals to be connected to the projection section to thereby switch the image signals to be input to the projection section, and the control signal includes a command signal adapted to make the input signal switching section switch the signal terminals to be connected to the projection section. According to the projector of this aspect of the invention, since the image signals used for the projection display are switched in accordance with the command of another projector, the image display system with high controllability can be configured.

(8) The projector of the above aspect of the invention may be configured such that the control signal includes a command signal adapted to make the projection section project an operation image adapted to receive an operation related to the projection image from a user. According to the projector of this aspect of the invention, since the operation window is displayed in accordance with the command of another projector, the operability and the controllability of the image display system operating in cooperation with another projector can be enhanced.

(9) Still another aspect of the invention provides an image display system including a first projector, and a second projector, the first and second projectors forming projection images on a common projection surface in cooperation with each other. In this image display system, the first projector includes a first projection section adapted to display the projection image, which is to be combined with the projection image projected by the second projector, by projection on the common projection surface, and a master control section adapted to control the first projection section, and to transmit a control signal adapted to control the projection of the second projector to the second projector, and the second projector includes a second projection section adapted to project an image based on an image signal on the common projection surface, and a subordinate control section adapted to receive the control signal from the first projector, and to control the second projection section based on the control signal. According to the image display system of this aspect of the invention, since the first and second projectors can be made to work with each other by the control signal, the controllability of the system can be enhanced.

(10) The image display system according to the above aspect of the invention may be configured such that the first projector further includes an operation section adapted to receive an operation by a user, and in response to receiving the operation by the user via the operation section, the master control section controls the first projection section in accordance with the operation by the user, and transmits the control signal corresponding to the operation by the user to the second projector. According to the image display system of this aspect of the invention, the usability of the system can be enhanced.

(11) The image display system according to the above aspect of the invention may be configured such that the first projector further includes an image capturing section adapted to capture the common projection surface on which the projection image of the second projector is displayed, and generates a captured image, and an image correction section adapted to correct an image to be a projection object of the first projection section based on the projection image of the second projector included in the captured image, the operation section receives a correction instruction operation adapted to instruct a correction of the projection images, which are formed on the common projection surface by the first and second projectors in cooperation with each other, from the user, the control signal includes a correction command signal, which is transmitted in response to receiving the correction instruction operation, the subordinate control section of the second projector (i) makes the second projection section project a reference image to be a reference of the correction of the projection image of the first projector in response to receiving the correction command signal, and the master control section of the first projector (ii) makes the image capturing section take an image of the common projection surface on which the reference image is projected, and (iii) makes the image correction section perform the correction based on the captured image including the taken image of the projection image including the projection of the reference image. According to the image display system of this aspect of the invention, the correction process to be performed by the first and second projectors in cooperation with each other can easily be performed in accordance with the operation of the user. Therefore, the controllability and the usability of the system are enhanced.

(12) Yet another aspect of the invention provides a method of controlling a projector. This control method includes receiving a control signal from another projector, and projecting an image represented by an image signal on a projection surface based on the control signal. According to the control method of this aspect of the invention, it is possible to easily operate the projector in cooperation with another projector.

(13) Still yet another aspect of the invention provides a method of controlling a projector adapted to form a projection image on a projection surface in cooperation with another projector. The method of controlling a projector includes (a) displaying a projection image, which is to be combined with a projection image of another projector displayed on projection surface, by projection on the projection surface, and (b) transmitting a control signal adapted to control the projection of the another projector to the another projector. According to the control method of this aspect of the invention, it is possible to easily operate the projector in cooperation with another projector.

All of the plurality of constituents provided to each of the aspects of the invention described above are not necessarily essential, and in order to solve all or a part of the problems described above, or in order to achieve all or a part of the advantages described in the specification, it is possible to arbitrarily perform modification, elimination, replacement with another new constituent, partial deletion of restriction content on some of the plurality of constituents. Further, in order to solve all or a part of the problems described above, or in order to achieve all or a part of the advantages described in the specification, it is also possible to combine some or all of the technical features included in one of the aspects of the invention with some or all of the technical features included in another of the aspects of the invention to thereby form an independent aspect of the invention.

For example, an aspect of the invention can be implemented as a device provided with at least one of two elements, namely a projection section and a control section. In other words, it is possible for the device to include the projection section, and to fail to include the projection section. Further, it is possible for the device to include the control section, and to fail to include the control section. The projection section can be configured as, for example, a projection section for projecting the image based on the image signal on the projection surface in accordance with the control signal from another projector, or can be configured as a projection section for displaying the projection image to be combined with the projection image of another projector by projection on the projection surface. Further, the control section can be configured as a control section for receiving the control signal from another projector and controlling the projection section based on the control signal, or can be configured as a control section for controlling the projection section, and at the same time, transmitting a control signal for controlling the projection of another projector to another projector. Such a device can be implemented as, for example, a projector, but can also be implemented as another device other than the projector. According to such an aspect of the invention, it is possible to solve at least one of a variety of problems such as downsizing of the device, cost reduction, resource saving, enhancement of easiness of manufacturing, and enhancement of usability. Some or all of the technical features of the projector as each of the aspects of the invention can be applied to this device.

The invention can also be implemented as a variety of aspects in addition to the projectors, the image display systems, and the control methods. The invention can be implemented in the forms of, for example, a correction method of an image in a projector, a control method of an image display system, a computer program for implementing the correction method and the control method, and a non-temporary recording medium on which the computer program is recorded.

BRIEF DESCRIPTION OF THE DRAWINGS

The invention will be described with reference to the accompanying drawings, wherein like numbers reference like elements.

FIG. 8A is a schematic diagram for explaining an acquisition process of coordinate conversion $\phi$, and FIG. 8B is a schematic diagram for explaining an acquisition process of panel coordinates of the measurement points using the coordinate conversion $\phi$.

DESCRIPTION OF EXEMPLARY EMBODIMENTS

A. First Embodiment

Figure 1A:
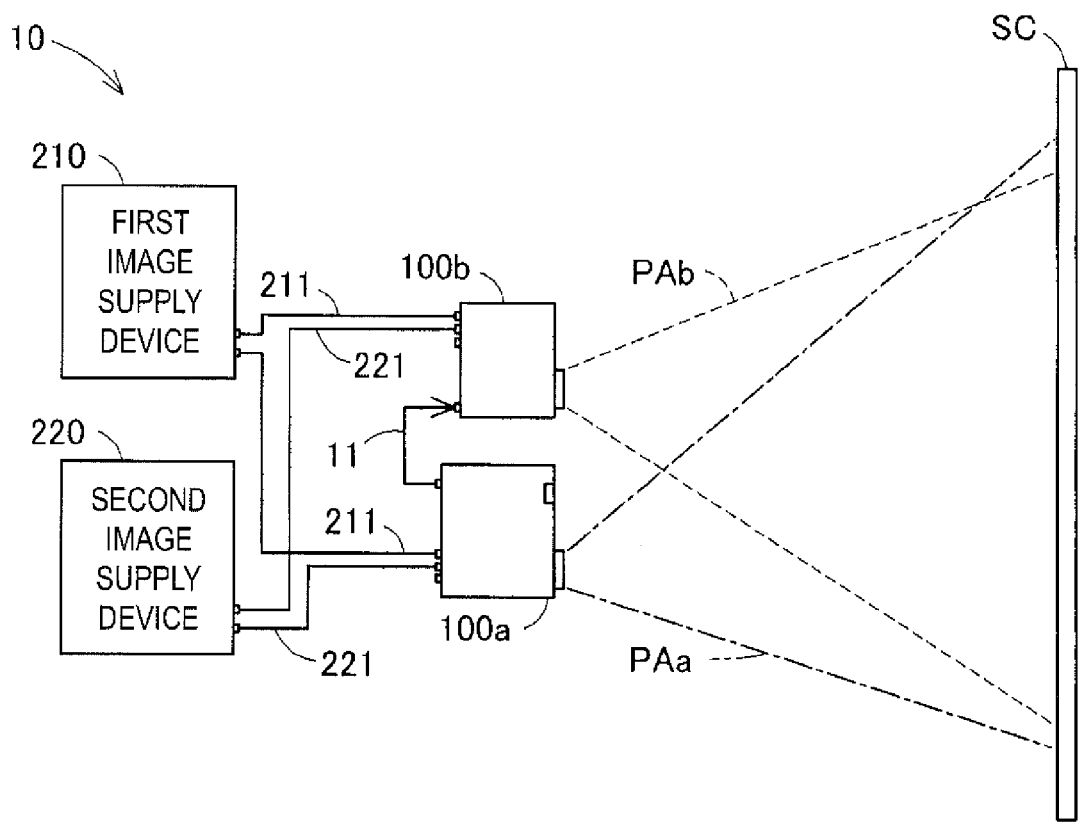
FIGS. 1A and 1B are schematic diagrams showing a configuration of an image display system according to a first embodiment of the invention.
Figure 1B:
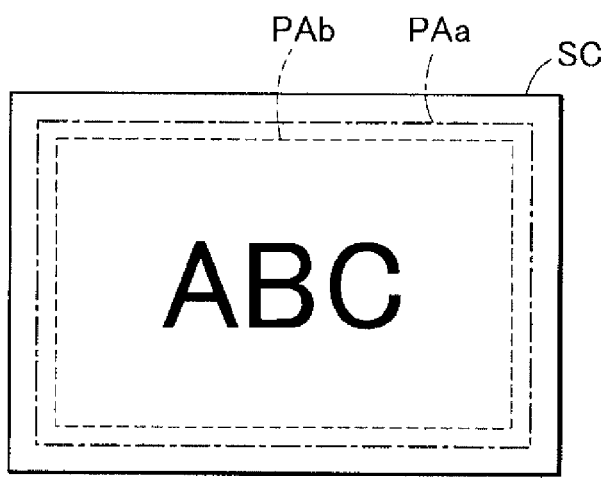

FIG. 1A is a schematic diagram showing a configuration of an image display system 10 according to a first embodiment of the invention. FIG. 1B is a schematic diagram showing the condition in which a projection image is generated on a projection screen SC by the image display system 10. It should be noted that in FIGS. 1A and 1B, the ranges of the projection areas PAa, PAb of first and second projectors 100a, 100b are respectively shown with the dotted line and the dashed-dotted line.

The image display system 10 is provided with the first and second projectors 100a, 100b, and first and second image supply devices 210, 220. The image display system 10 performs the so-called stack projection of superimposing the respective projection images of the first and second projectors 100a, 100b on the projection screen SC to thereby generate a single projection image. It should be noted that when performing the stack projection, the projection area PAa of the first projector 100a is adjusted to include the projection area PAb of the second projector 100b on the projection screen SC.

Here, in the image display system 10, the first and second projectors 100a, 100b are connected to each other via a signal line 11. The first and second projectors 100a, 100b communicate with each other via the signal line 11 to thereby perform the operation related to the projection display to the projection screen SC in cooperation with each other. The cooperative action between the first and second projectors 100a, 100b will be described later. It should be noted that the signal line 11 can be formed of, for example, universal serial bus (USB) or RS-232C.

The first and second image supply devices 210, 220 are connected to both of the first and second projectors 100a, 100b via the respective signal lines 211, 221, and supply the projectors 100a, 100b with the image signals representing the images to be the projection objects. The first and second image supply devices 210, 220 each can be formed of, for example, a personal computer or a video playback device such as a DVD player. It should be noted that when performing the stack projection, each of the projectors 100a, 100b uses either one of the image signals of the first and second image supply devices 210, 220.

Figure 2:
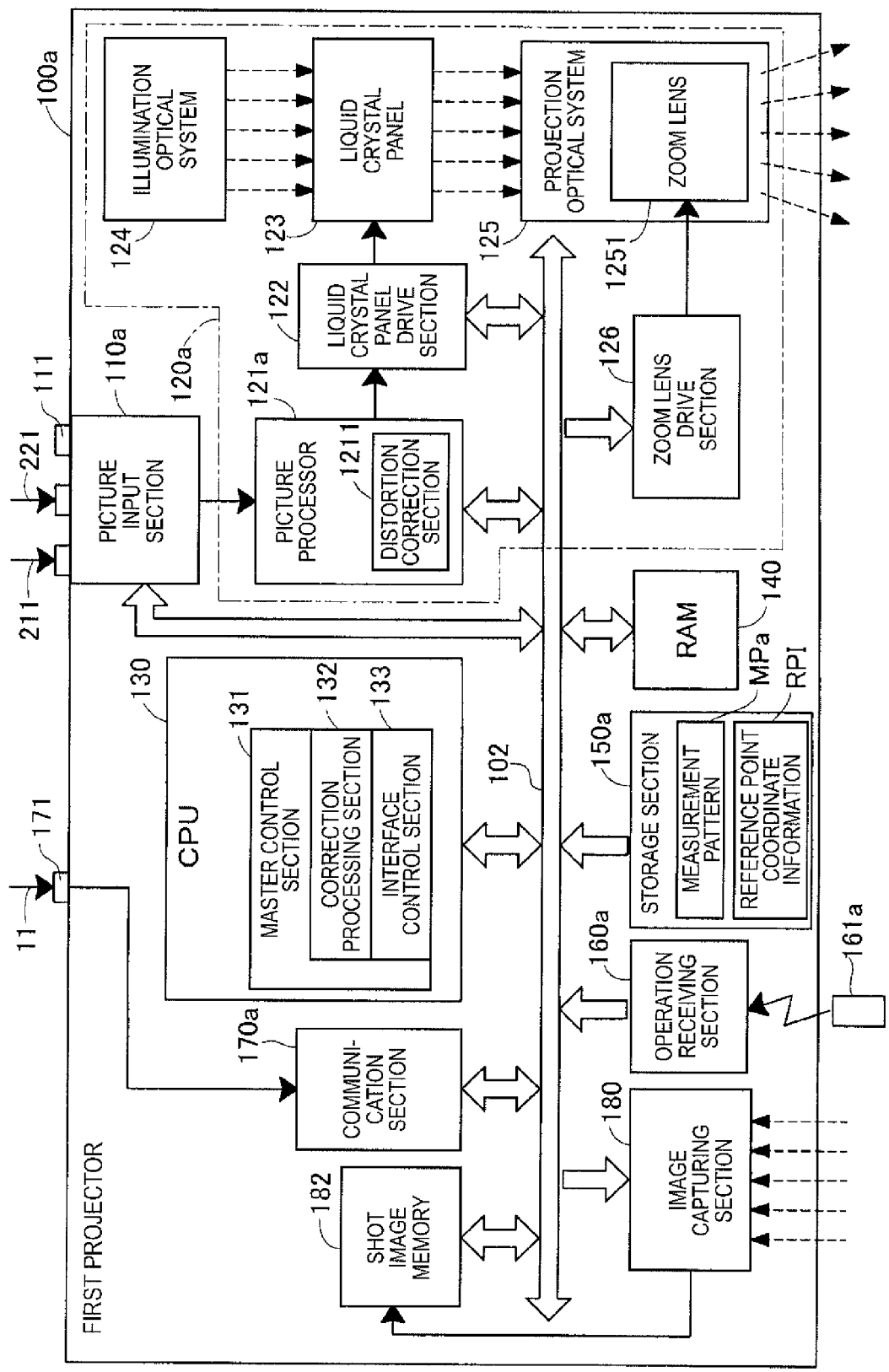
FIG. 2 is a schematic diagram showing an internal configuration of a first projector.

FIG. 2 is a schematic diagram showing an internal configuration of the first projector 100a. The first projector 100a is provided with a picture input section 110a, a projection section 120a, a central processing unit (CPU) 130, a main storage device (RAM) 140, a storage section 150a, an operation receiving section 160a, a communication section 170a, an image capturing section 180, and a captured image memory 182.

The picture input section 110a has a plurality of (three in the drawing) input terminals 111. The signal lines 211, 221 of the first and second image supply devices 210, 220 are respectively connected to two of the input terminals 111. The picture input section 110a is provided with, for example, an A/D converter circuit for converting an analog image signal to a digital image signal, and converts a picture signal having received via the input terminal 111 into a digital signal, which can be processed by the projection section 120a, and then transmits the digital signal to the projection section 120a.

Here, the picture input section 110a of the present embodiment is connected to an internal bus 102. The picture input section 110a receives a command from a master control section 131 via the internal bus 102, and switches the input terminals 111 to select one to be connected to the projection section 120a in accordance with the command. In other words, the picture input section 110a switches the input channels for inputting the image signal to the projection section 120a in accordance with the command of the master control section 131.

The projection section 120a performs a projection display process using the image signal received from the picture input section 110a. The projection section 120a is provided with a picture processor 121a, a liquid crystal panel drive section 122, a liquid crystal panel 123, an illumination optical system 124, a projection optical system 125, and a zoom lens drive section 126.

The picture processor 121a, the liquid crystal panel drive section 122, and the liquid crystal panel 123 are connected to each other with signal lines dedicated to transmitting the image signal. Further, the picture processor 121a, the liquid crystal panel drive section 122, and the zoom lens drive section 126 are connected to the internal bus 102, and receive control commands and processing information sent from the CPU 130.

The picture processor 121a is a processor for processing the image signal. The picture processor 121a performs a predetermined correction process such as a keystone correction or a color correction on the image signal obtained from the picture input section 110a, and then outputs the result to the liquid crystal panel drive section 122. Here, in the first projector 100a, the picture processor 121a is provided with a distortion correction section 1211. The distortion correction section 1211 corrects the image signal for the projection display obtained from the picture input section 110a in accordance with a correction value for the stack correction calculated by the master control section 131.

The liquid crystal panel drive section 122 drives the liquid crystal panel 123 based on the image signal obtained from the picture processor 121a to thereby form an image (a panel image) on a panel surface of the liquid crystal panel 123. The liquid crystal panel 123 is a light modulation device for modulating the incident light based on the image signal. Illumination light emitted from the illumination optical system 124 is modulated by the panel image formed on the liquid crystal panel 123 into the image light representing the image. The image light modulated in the liquid crystal panel 123 is projected to the projection screen SC via the projection optical system 125. It should be noted that the projection optical system 125 is provided with a zoom lens 1251, the focal distance of which is controlled by an electric motor provided to the zoom lens drive section 126.

The CPU 130, the RAM 140, and the storage section 150a are connected to each other via the internal bus 102. The CPU 130 reads and then performs a predetermined program, which has previously been stored in the storage section 150a, to thereby function as the master control section 131. The master control section 131 controls each of configuration sections 121a, 122, and 126 of the projection section 120a connected thereto via the internal bus 102 to thereby perform a process of displaying the projection image. Further, the master control section 131 generates the control signal for making the second projector 100b perform a cooperative action, and then transmits the control signal to the second projector 100b via the communication section 170a.

Further, the master control section 131 has a function as a correction processing section 132 for performing the stack correction process to be performed in cooperation with the second projector 100b. The stack correction process will be described later. Further, the master control section 131 also functions as an interface control section 133 for displaying an operation window, which can be used by the user using a pointer or the like, by projection, and then receiving the operation to the image display system 10 from the user via the operation window. The operation window and the operations to the image display system 10 from the user via the operation window will be described later.

The storage section 150a is formed of a nonvolatile storage section. The storage section 150a can be configured as, for example, a ROM, or can also be configured as an external storage device such as a USB memory. The storage section 150a previously stores image data of a measurement pattern MPa and reference point coordinate information RPI used for the stack correction in addition to a variety of types of programs to be executed by the CPU 130 described above. The measurement pattern MPa and the reference point coordinate information RPI will be described later.

The operation receiving section 160a receives operations of the user to the first projector 100a via buttons and touch panel (not shown) provided to the main body of the first projector 100a, or a remote controller 161a. The operation receiving section 160a transmits the operation content (the command) received from the user to the CPU 130. It should be noted that the user can operate the pointer displayed on the projection screen SC by projection using, for example, the remote controller 161a.

The communication section 170a is connected to a terminal 171 to which the signal line 11 is connected, and the internal bus 102. The communication section 170a intervenes in the communication of the control signal between the master control section 131 and a subordinate control section 135 (described later) of the second projector 100b via the signal line 11.

The image capturing section 180 can be formed of an image sensor such as a CMOS sensor or a CCD sensor. The image capturing section 180 is fixedly disposed at a position where the projection image of the projection optical system 125 can be captured, which is located at a predetermined distance from the projection optical system 125. The image capturing section 180 is connected to the internal bus 102, and captures the projection screen SC, on which one of the first and second projectors 100a, 100b projects the projection image, under the control of the master control section 131.

The captured image memory 182 is connected to the image capturing section 180 via a dedicated signal line. The captured image memory 182 stores the captured image data of the image capturing section 180. It should be noted that the captured image memory 182 is connected to the internal bus 102, and the CPU 130 can read the captured image data stored in the captured image memory 182 via the internal bus 102.

Figure 3:
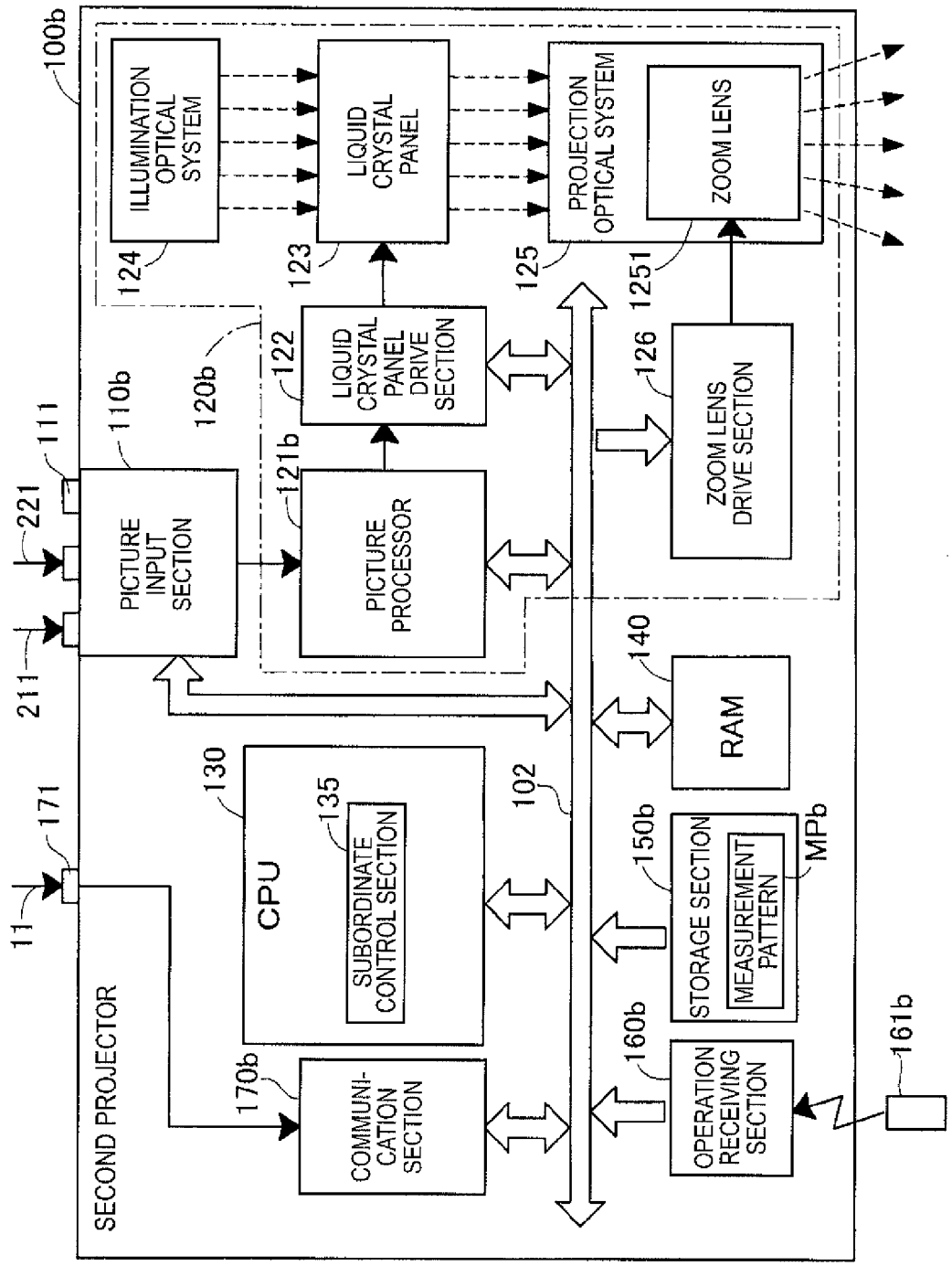
FIG. 3 is a schematic diagram showing an internal configuration of a second projector.

FIG. 3 is a schematic diagram showing an internal configuration of the second projector 100b. The second projector 100b has a configuration in common with the first projector 100a (FIG. 2) except the points described below. It should be noted that in FIG. 3, the constituents the second projector 100b has in common with the first projector 100a are denoted with the same reference symbol as shown in FIG. 2.

A picture input section 110b of the second projector 100b has substantially the same configuration as that of the picture input section 110a of the first projector 100a. The picture input section 110b of the second projector 110b receives a command from the subordinate control section 135 via the internal bus 102, and then switches the input channels of the image signal in accordance with the command.

A projection section 120b of the second projector 100b has substantially the same configuration as that of the projection section 120a of the first projector 100a except the point that a picture processor 121b is provided instead of the picture processor 121a. The picture processor 121b of the second projector 100b has substantially the same configuration as that of the picture processor 121a of the first projector 100a except the point that the distortion correction section 1211 is not provided.

In the second projector 100b, the image capturing section 180 and the captured image memory 182 are eliminated. A storage section 150b of the second projector 100b can be formed of a nonvolatile storage device similar to the storage section 150a of the first projector 100a. The storage section 150b stores image data of the measurement pattern MPb instead of the image data of the measurement pattern MPa, but does not store the reference point coordinate information RPI. The measurement pattern MPb will be described later.

Further, in the second projector 100b, the CPU 130 functions as the subordinate control section 135. The subordinate control section 135 receives the control signal from the first projector 100a via a communication section 170b, and then controls each of the constituents including the projection section 120b based on the control signal.

It should be noted that an operation receiving section 160b of the second projector 100a has substantially the same configuration as that of the first projector 160a, and is capable of receiving the operation of the user via a remote controller 161b. Similarly to the first projector 100a, the communication section 170b of the second projector 100b is connected to the terminal 171 connected to the signal line 11, and the internal bus 102 so as to be able to intervene in the communication of the control signal.

Due to the configuration described above, in the image display system 10, the first and second projectors 100a, 100b operate in cooperation with each other by the communication of the control signal between the master control section 131 and the subordinate control section 135, and perform a variety of processes. Hereinafter, a specific example of the processing content will be explained.

Figure 4:
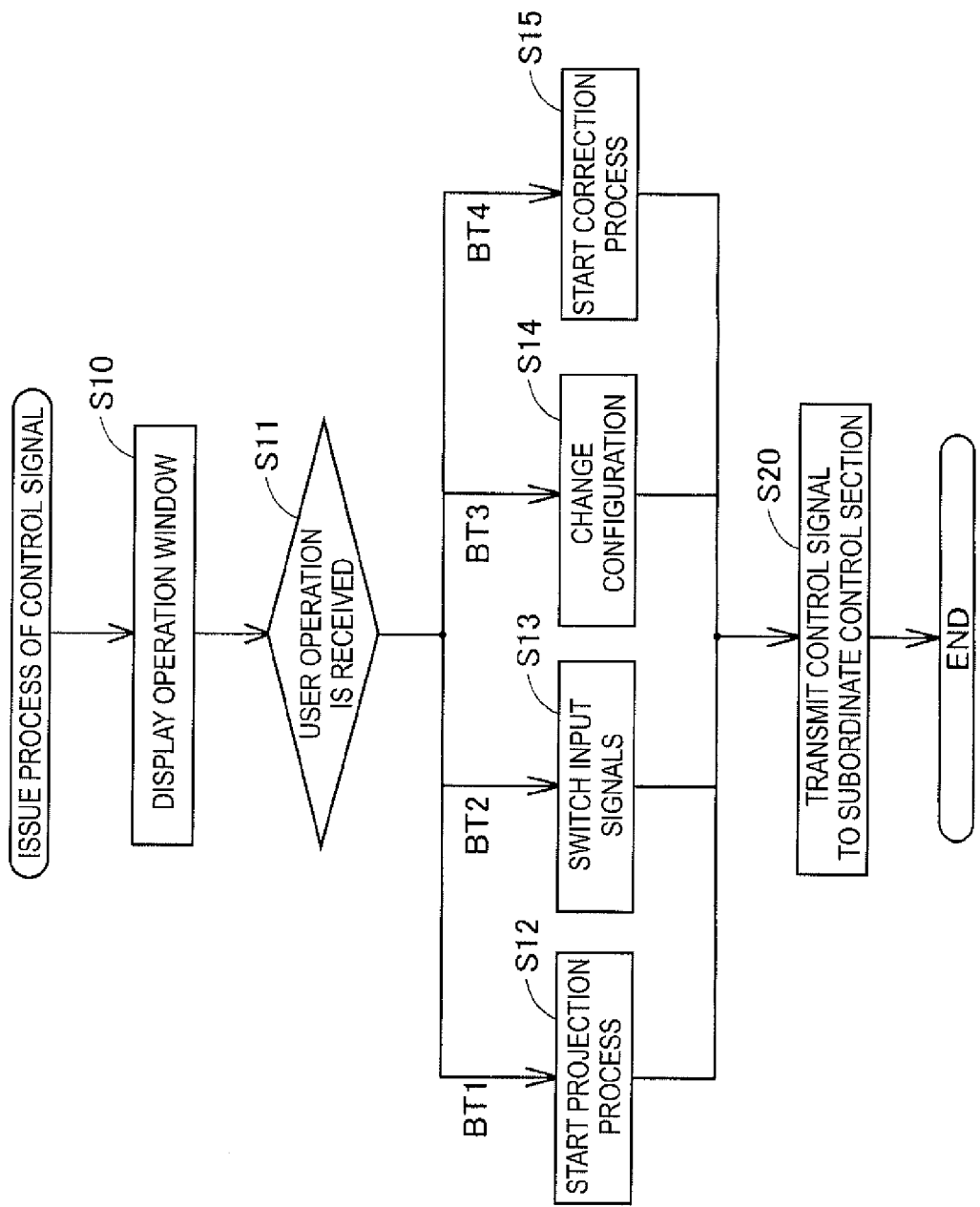
FIG. 4 is an explanatory diagram for explaining an issue procedure of a control signal in the first projector.

FIG. 4 is an explanatory diagram for explaining an issue procedure of a control signal in the first projector 100a. In the step S10, the master control section 131 makes the projection section 120a display an image of the operation window, which is for receiving the user operation, by projection. In the step S1l, the master control section 131 starts receiving the user operation using the operation window.

Figure 5:
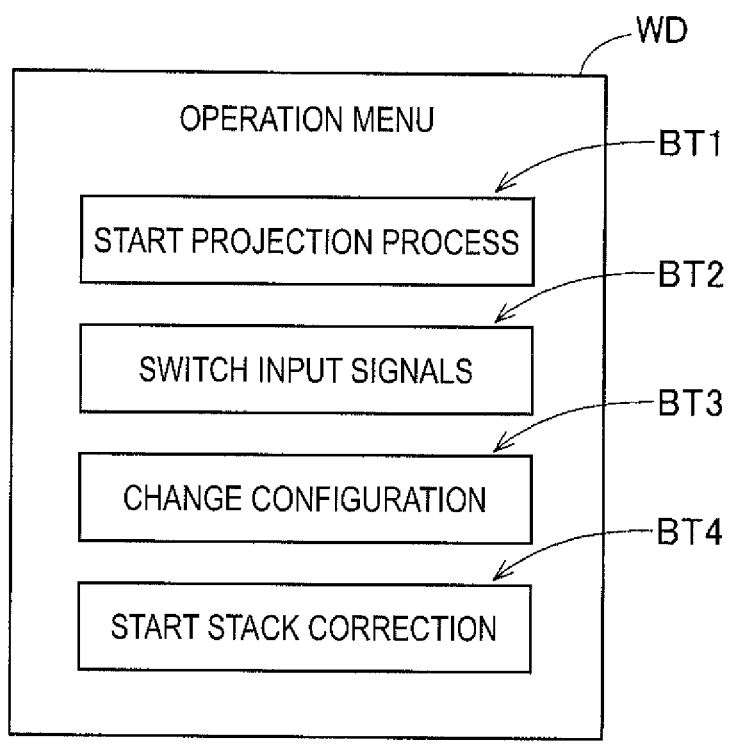
FIG. 5 is a schematic diagram showing an example of an operation window displayed by projection by the first projector.

FIG. 5 is a schematic diagram showing an example of the operation window WD displayed by projection by the first projector 100a. In the operation window WD, there is shown a list of the operations (an operation menu), which are allowed for the user to instruct the image display system 10 to perform, as the button images BT1 through BT4. The user can perform a holding-down operation to each of the button images BT1 through BT4 by operating the pointers (not shown) displayed on the projection screen SC via the remote controller 161a and so on.

It should be noted that in the present embodiment the following operations are set to the respective button images BT1 through BT4. To the first button image BT1, there is set "START PROJECTION PROCESS." To the second button image BT2, there is set "SWITCH INPUT SIGNALS." To the third button image BT3, there is set "CHANGE CONFIGURATION." To the fourth button image BT4, there is set "START STACK CORRECTION."

1. In the case in which the holding-down operation is performed on the first button image BT1 (the step S12 in FIG. 4), the master control section 131 of the first projector 100a performs the following process. The master control section 131 makes the projection section 120a of the first projector 100a start the projection display of the image using the image signal received from the picture input section 110a. Further, the master control section 131 transmits (step S20) the control signal, which instructs to start the projection display using the image signal received from the picture input section 110b to the projection section 120b of the second projector 100b, to the subordinate control section 135 of the second projector 100b. Thus, the image display system 10 can start the display of the projection image by the first projector 100a and the display of the projection image by the second projector 100b at roughly the same time.

2. In the case in which the holding-down operation is performed on the second button image BT2 (step S13), the master control section 131 makes the image input section 110a of the first projector 100a switch the input channels of the image signal to be transmitted to the projection section 120a. For example, in the case in which the picture input section 110a transmits the image signal, which is received from the first image supply device 210, to the projection section 120a, the master control section 131 makes the picture input section 110a start transmitting the image signal, which is received from the second image supply device 220, to the projection section 120a.

Further, the master control section 131 issues (step S20) the control signal, which makes the picture input section 110b of the second projector 100b perform switching of the input channels substantially the same as the switching performed in the first projector 100a, to the subordinate control section 135 of the second projector 100b. Thus, the image display system 10 can switch the supply sources of the projection image of the first projector 100a and the supply sources of the projection image of the second projector 100b at roughly the same time.

It should be noted that when performing this process, it is also possible to arrange that the master control section 131 of the first projector 100a displays an operation screen for the user to designate the input channel, and then receives the designation operation. In this case, the master control section 131 commands the picture input section 110a of the first projector 100a and the subordinate control section 135 of the second projector 100b to switch the input channels in accordance with the designation operation.

3. In the case in which the holding-down operation is performed on the third button image BT3 (step S14), the master control section 131 of the first projector 100a displays an operation screen for receiving the setting operation regarding the display state of the projection image by the user. It should be noted that as the "setting operation regarding the display state of the projection image," there can be cited, for example, a setting operation of a display size including the aspect ratio of the projection image, and a setting operation of the display mode of the projection image set previously.

The master control section 131 of the first projector 100a controls each of the constituents of the projection section 120a in accordance with the change in configuration received from the user. Further, the master control section 131 transmits the control signal, which instructs to control the projection section 120b of the second projector 100b in accordance with the change in configuration described above, to the subordinate control section 135 of the second projector 100b. Thus, the image display system 10 can change the display state of the projection image of the first projector 100a and the display state of the projection image of the second projector 100b at roughly the same time in accordance with the setting operation.

4. In the case in which the holding-down operation is performed on the fourth button image BT4 (step S15), the master control section 131 starts the stack correction process.

Further, the master control section 131 transmits (step S20) the control signal, which instructs to start the projection display of the measurement pattern MPb, to the subordinate control section 135 of the second projector 100b. It should be noted that details of the stack correction process in the image display system 10 will hereinafter be explained.

Figure 6:
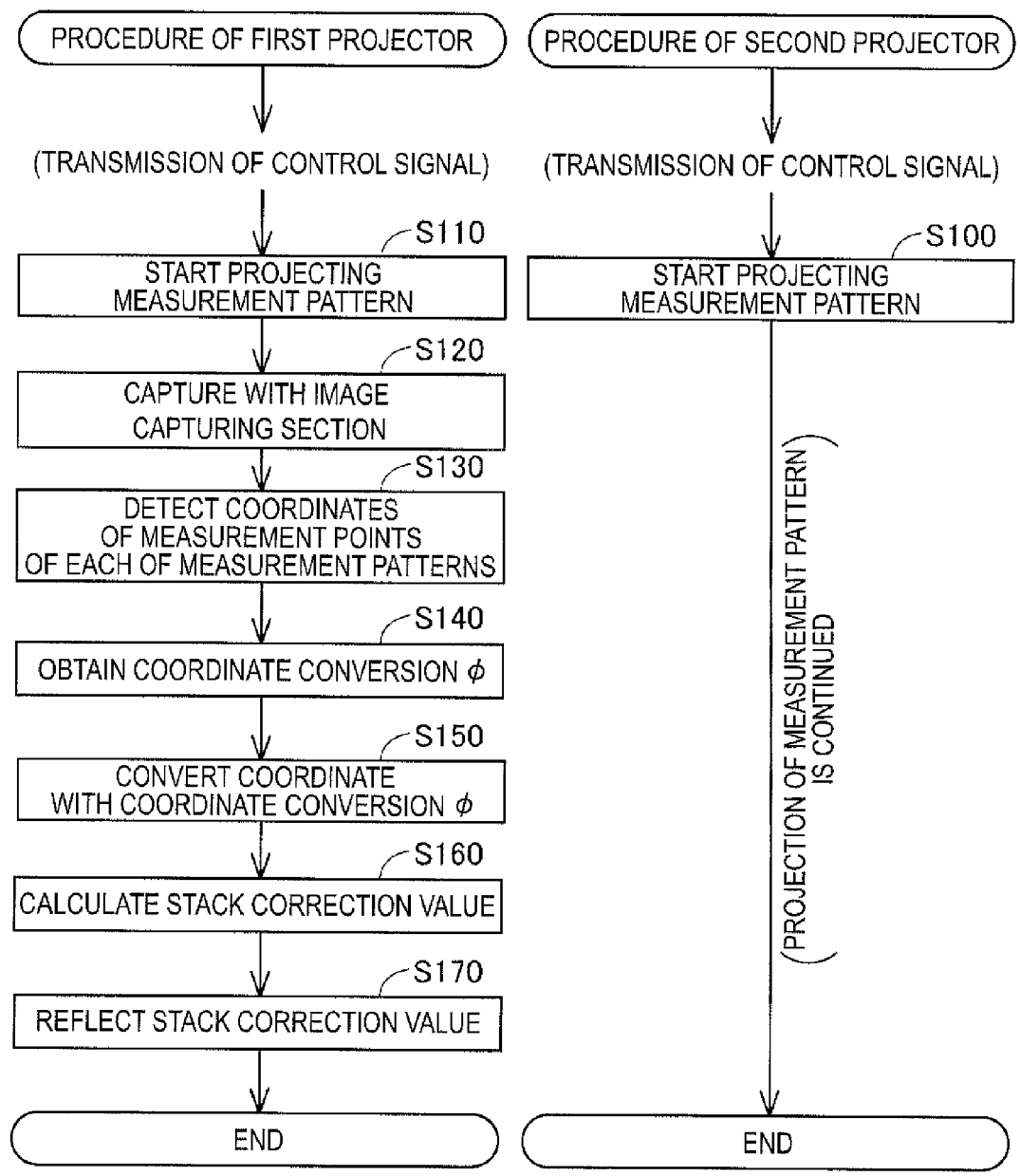
FIG. 6 is an explanatory diagram showing a processing procedure of a stack correction process in the image display system.

FIG. 6 is an explanatory diagram showing a processing procedure of the stack correction process in the image display system 10. FIG. 6 shows the flowcharts respectively showing the processing procedures of the first and second projectors 100a, 100b in the stack correction process in parallel to each other.

The subordinate control section 135 of the second projector 100b receives the control signal instructing to start projecting the measurement pattern MPb, and then reads the image data of the measurement pattern MPb from the storage section 150b. Then, the subordinate control section 135 of the second projector 100b makes the projection section 120b start (step S100) the projection display of the measurement pattern MPb. Meanwhile, the master control section 131 of the first projector 100a reads the image data of the measurement pattern MPa from the storage section 150a, and then makes the projection section 120a start (step S110) the projection display of the measurement pattern MPa.

Figure 7A:
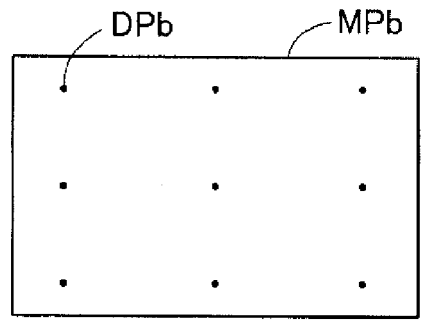
FIGS. 7A and 7B are schematic diagrams showing an example of two measurement patterns.

FIG. 7A is a schematic diagram showing an example of the measurement pattern MPb displayed by projection by the second projector 100b. The measurement pattern MPb is composed of figures and symbols representing a plurality of measurement points DPb the coordinates of which are detected in the following process. In the measurement pattern MPb of the present embodiment, there are displayed dot marks at positions of the respective measurement points DPb. It should be noted that in the measurement pattern MPb of the present embodiment, the measurement points DPb are set at the 9 positions described below. The measurement points DPb are respectively set to the centers of the divisional areas located at the four corners of the image out of the divisional areas obtained by dividing the image into four equal parts in each of vertical and horizontal directions, the middle points between the measurement points DPb on the corners, and the center of the image.

Figure 7B:
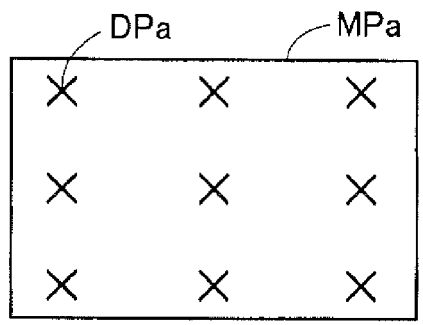

FIG. 7B is a schematic diagram showing an example of the measurement pattern MPa displayed by projection by the first projector 100a. The measurement pattern MPa is composed of figures and symbols representing a plurality of measurement points DPa the coordinates of which are detected in the following process similarly to the measurement pattern MPb displayed by projection by the second projector 100b described above. It should be noted that in the measurement pattern MPa of the present embodiment, the measurement points DPa are set to the same coordinates as those of the respective measurement points DPb of the measurement pattern MPb, and the measurement points DPa are each indicated by the intersection of the straight lines in the cross mark (the symbol "x").

Figure 7C:
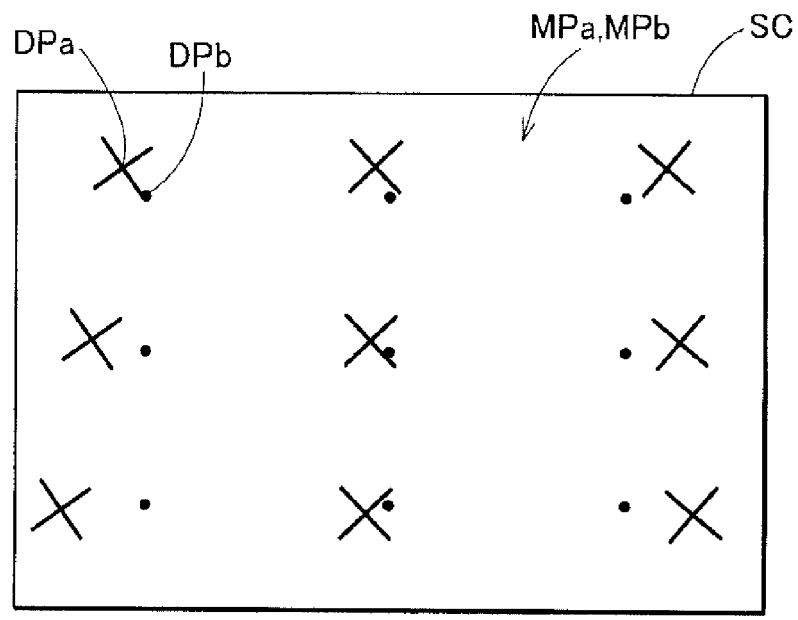
FIG. 7C is a schematic diagram showing a projection screen on which the two measurement patterns are projected.

FIG. 7C is a schematic diagram showing the projection screen SC on which the measurement patterns MPa, MPb described above are displayed by projection by the first and second projectors 100a, 100b. On the projection screen SC, there are displayed the projection image of the measurement pattern MPa projected by the first projector 100a and the projection image of the measurement pattern MPb projected by the second projector 100b in an overlapping manner.

In this stage, the coordinate systems of the respective projection images do not coincide with each other, and on the projection screen SC, the dot marks of the measurement pattern MPb and the intersections of the cross marks of the measurement pattern MPa are displayed at positions shifted from each other. In the following correction process, the correction is performed so that the positions of the dot marks of the measurement pattern MPb and the positions of the intersections of the cross marks of the measurement pattern MPa coincide with each other. It should be noted that in this stage, it is preferable that the distortion of the projection image of the second projector 100b has been corrected.

In the step S120 (FIG. 6), the master control section 131 of the first projector 100a makes the image capturing section 180 capture the projection screen SC on which the two measurement patterns MPa, MPb are displayed by projection. In the step S130, the master control section 131 detects the coordinate on the captured image of each of the measurement points DPa, DPb of the two measurement patterns MPa, MPb from the captured image obtained by the image capturing section 180. It should be noted that since in the present embodiment the measurement points DPa and the measurement points DPb are indicated by the respective marks different from each other, it is easy to separately detect the coordinates thereof.

FIG. 8A is a schematic diagram for explaining the process of obtaining the coordinate conversion φ in the step S140. FIG. 8A shows a schematic diagram of the captured image CI obtained in the step S120 and a schematic diagram of a panel surface of the liquid crystal panel 123 of the first projector 100a when displaying the measurement pattern MPa by projection in parallel to each other.

Here, in the present specification, a coordinate system on the captured image obtained by the image capturing section 180 is hereinafter referred to as an "imaging coordinate system," and a coordinate in the imaging coordinate system is hereinafter referred to as an "imaging coordinate." Further, a coordinate system on an image forming area 123i, which is an area in the panel surface of the liquid crystal panel 123 where an image is formed, is referred to as a "panel coordinate system," and a coordinate in the panel coordinate system is referred to as a "panel coordinate." It should be noted that when the "panel coordinate system" and the "panel coordinate" are hereinafter referred to, the panel coordinate system and the panel coordinate in the liquid crystal panel 123 of the first projector 100a are denoted unless otherwise noted.

In the step S140, the master control section 131 obtains the panel coordinate $(x_a, y_a)$ of each of the measurement points DPa of the measurement pattern MPa based on the image data of the measurement pattern MPa. The image data of the measurement pattern MPa has previously been stored in the storage section 150a of the first projector 100a, and it is also possible to previously prepare the panel coordinate $(x_a, y_a)$ of each of the measurement points DPa of the measurement pattern MPa. Then, the master control section 131 derives the coordinate conversion φ obtained as the projective transformation of the panel coordinate system and the imaging coordinate system based on the panel coordinate $(X_a, Y_a)$ thereof and the imaging coordinate $(X_a, Y_a)$ of each of the measurement points DPa in the captured image CI having been obtained in the step S130.

FIG. 8B is a schematic diagram for explaining the process of obtaining the panel coordinate of each of the measurement points DPb of the measurement pattern MPb using the coordinate conversion φ in the step S150. FIG. 8B shows a schematic diagram of the captured image CI similar to FIG. 8A, and a schematic diagram of a panel surface of the liquid crystal panel 123 of the first projector 100a in parallel to each other.

In the step S150, the master control section 131 converts the imaging coordinate $(X_b, Y_b)$ of each of the measurement points DPb of the measurement pattern MPb in the captured image CI, which is obtained in the step S130, using the coordinate conversion φ. It should be noted that the conversion coordinate ($x_{bp}$, $y_{bp}$) obtained by the coordinate conversion φ corresponds to the coordinate of each of the measurement points DPb of the measurement pattern MPb in the panel coordinate system.

In the step S160, the master control section 131 calculates the stack correction value using the conversion coordinate ($x_{bp}$, $y_{bp}$) of each of the measurement points DPb and the reference point coordinate information RPI (FIG. 2) stored in the storage section 150a. Here, the reference point coordinate information RPI includes a coordinate I ($x_b$, $y_b$) on the image of each of the measurement points DPb of the measurement pattern MPb (FIG. 7A) displayed by projection by the second projector 100b. The master control section 131 calculates the stack correction value, with which the shift between the coordinate ($x_b$, $y_b$) and the conversion coordinate P ($x_{bp}$, $y_{bp}$) having been obtained in the step S150 is reduced, by a method known to the public in such a manner as described below.

The master control section 131 derives a correspondence relationship between the panel coordinates of the first and second projectors 100a, 100b based on the conversion coordinate P ($x_{bp}$, $y_{bp}$) described above and the image coordinate I ($x_b$, $y_b$). Then, the master control section 131 calculates the stack correction value based on the correspondence relationship. It should be noted that the stack correction value is a parameter of coordinate conversion ω for performing the conversion from the panel coordinate before the correction to the panel coordinate after the correction. The coordinate conversion ω is for making the relational expression 1 below true between the conversion coordinate P ($X_{bp}$, $Y_{bp}$) and the image coordinate I ($x_b$, $y_b$).

$$I(x_b, y_b) = \omega(P(x_{ap}, y_{ap})) \quad (1)$$

In the step S170, the master control section 131 starts the projection display reflecting the stack correction value. Specifically, the master control section 131 transmits the stack correction value to the distortion correction section 1211 of the picture processor 121a, and then makes the distortion correction section 1211 start the distortion correction based on the stack correction value. Thus, it is possible to make the coordinate system of the projection image of the first projector 100a coincide with the coordinate system of the projection image of the second projector 100b to thereby overlap the respective projection images of the first and second projectors 100a, 100b with high accuracy.

As described above, in the image display system 10, the stack correction for matching the projection image of the first projector 100a with the projection image of the second projector 100b is performed only by the user holding down the fourth button image BT4 of the operation window WD. Therefore, the accurate stack projection can more easily and promptly be started.

As described above, according to the image display system 10 of the present embodiment, it is possible to make the second projector 100b perform the cooperative action by the control signal issued by the master control section 131 of the first projector 100a, and thus the controllability of the image display system 10 is improved. Further, according to the image display system 10 of the present embodiment, since the user can perform a variety of processes related to the stack projection with the easy operation, the high usability can be assured.

B. Second Embodiment

Figure 9:
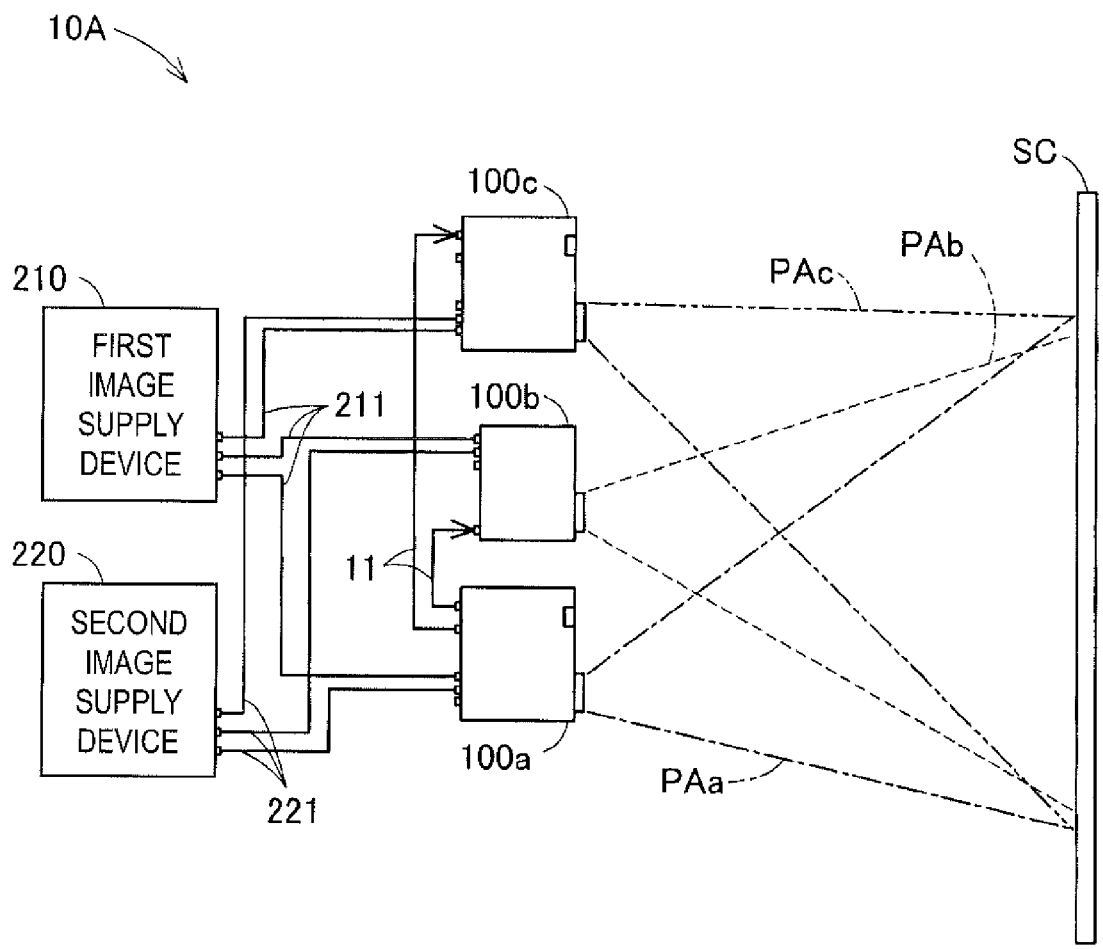
FIG. 9 is a schematic diagram showing a configuration of an image display system according to a second embodiment of the invention.

FIG. 9 is a schematic diagram showing a configuration of an image display system 10A according to a second embodiment of the invention. FIG. 9 is substantially the same as FIG. 1A except the point that a third projector 100c is added, and the point that the drawing of a projection area PAc of the third projector 100c is added. It should be noted that the configuration of the image display system 10A according to the second embodiment is substantially the same as that of the image display system 10 according to the first embodiment except the points described below.

The third projector 100c is connected to the first projector 100a via the signal line 11. Further, similarly to the other projectors 100a, 100b, the third projector 100c is connected to the first and second image supply devices 210, 220 via the signal lines 211, 221. It should be noted that when performing the stack projection, the projection area PAc of the third projector 100c is adjusted to include the projection area PAb of the second projector 100b on the projection screen SC.

Here, although not shown, the third projector 100c has substantially the same configuration as that of the first projector 100a (FIG. 2) except the point that the master control section 131 is not provided, but the subordinate control section 135 is provided similarly to the second projector 100b. Due to this configuration, the third projector 100c receives the control signal from the master control section 131 of the first projector 100a, and then performs a variety of processes related to the stack projection in cooperation with the first projector 100a based on the control signal.

It should be noted that when performing the stack correction process, the third projector 100c performs substantially the same process as that of the first projector 100a. In other words, the third projector 100c performs a correction of matching the coordinate system of the own projection image with the coordinate system of the projection image of the second projector 100b based on the measurement pattern MPb displayed by projection by the second projector 100b and the measurement pattern MPa displayed by projection by itself.

As described above, according to the image display system 10A of the second embodiment, the stack projection using the three projectors can be performed with a simpler operation. It should be noted that according to the configuration of the image display system 10A, it is possible to further add a projector having substantially the same configuration as that of the third projector 100c. In other words, according to the configuration of the second embodiment, the scalability of the system can be enhanced.

C. Third Embodiment

Figure 10:
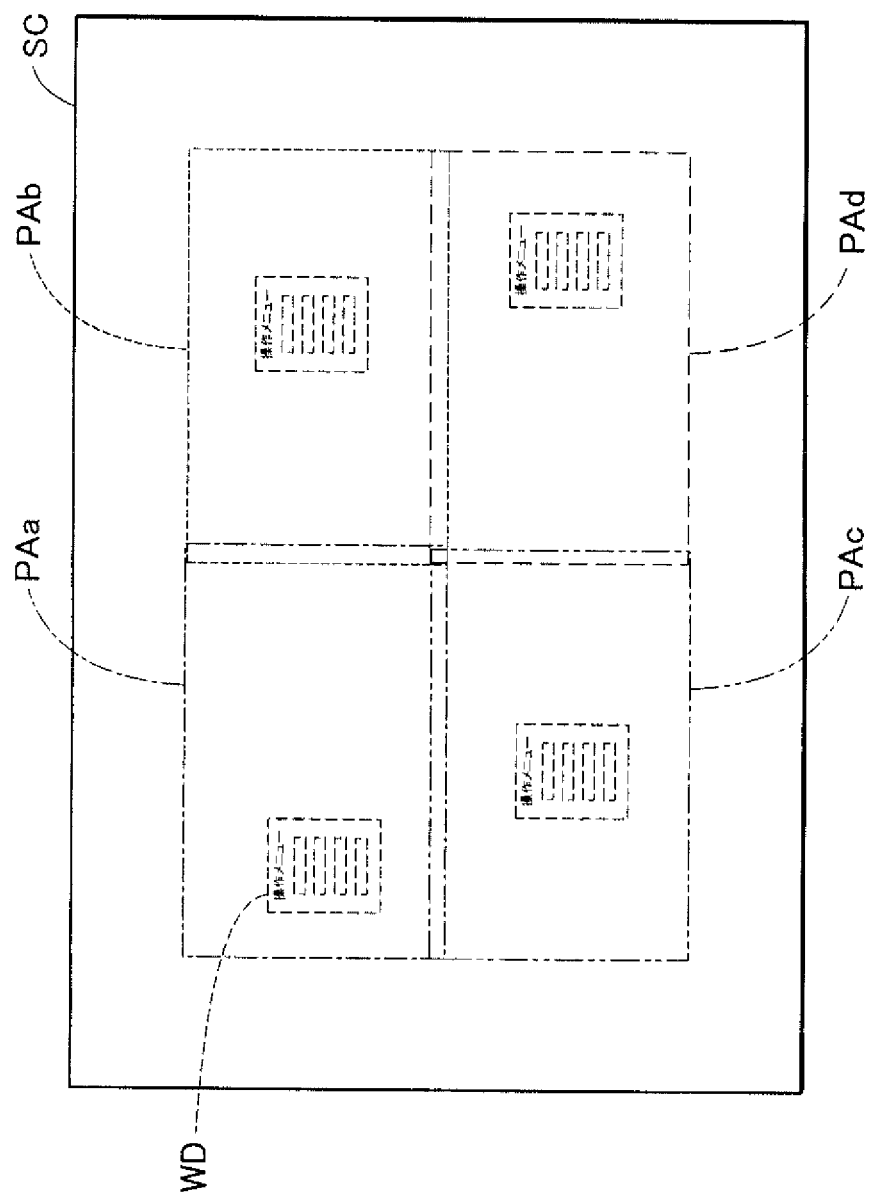
FIG. 10 is an explanatory diagram showing another configuration of projection display.

FIG. 10 is a schematic diagram for explaining a configuration of the projection display implemented by the image display system according to a third embodiment of the invention. FIG. 10 shows respective projection areas PAa through PAd of four projectors on the projection screen SC. Further, FIG. 10 shows an example of the display positions of the operation window WO explained with reference to FIG. 5 with the dotted lines on the projection screen SC for the sake of convenience of explanation.

The image display system according to the third embodiment has a configuration obtained by adding a fourth projector having substantially the same configuration as that of the third projector 100c to the image display system 10A according to the second embodiment described above. In other words, the image display system according to the third embodiment is provided with three projectors operating in cooperation with the first projector 100a based on the control signal transmitted from the first projector 100a.

In the image display system according to the third embodiment, the projection images of the four projectors can be arranged so as to be adjacent to each other in vertical and horizontal directions with the peripheral edge portions overlapping each other to thereby form a single display image (a so-called tiling image). It should be noted that in the present image display system, in the case in which the first projector 100a displays the operation window WD in the projection areas PAb through PAd other than the own projection area PAa, the first projector 100a transmits the control signal to the other projectors to make the other projectors display the operation window WD.

D. Modified Examples

D1. Modified Example 1

In the image display system according to any of the embodiments described above, the first projector 100a is provided with the function as the master control section 131, and the other projectors are provided with the function as the subordinate control section 135. However, it is also possible to assume that all of the projectors are provided with the functions of the master control section 131 and the subordinate control section 135 in the image display system. In this case, it is also possible to assume that each of the projectors appropriately switches the function as the master control section 131 and the function as the subordinate control section 135 in accordance with the system configuration. More specifically, it is also possible to arrange that each of the projectors switches the operation of exerting the function as the master control section 131 and the operation of exerting the function as the subordinate control section 135 in accordance of the direction of the USB connected thereto as the signal line 11.

D2. Modified Example 2

In the image display system 10 according to the first embodiment described above, the second projector 100b continues the projection display of the measurement pattern MPb during the period in which the first projector 100a performs the process for the stack correction. However, it is also possible for the second projector 100b to terminate the projection of the measurement pattern MPb prior to the termination of the stack correction by the first projector 100a. It should be noted that in each of the embodiments described above, only by the second projector 100b continuing the projection of the measurement pattern MPb without performing the switching process of the projection image or the halting process of the projection process, the first projector 100a completes the stack correction. Therefore, the stack correction can more easily be performed.

D3. Modified Example 3

In the image display systems 10, 10A according to the embodiments described above, the first and second projectors 100a, 100b project the images from the direction opposed straight to the image display surface side (the front side) of the projection screen SC. However, it is also possible to assume that the image display system 10 is configured as a so-called rear projection system for making the first and second projectors 100a, 100b project images from the back side of the projection screen SC.

D4. Modified Example 4

In the image display systems 10, 10A of the embodiments described above, the liquid crystal panel 123 is used as the light modulation device for modulating the incident light in accordance with the image signal. However, it is also possible for the image display systems 10, 10A to use digital mirror device (DMD) as the light modulation device. Further, the liquid crystal panel 123 can also be a reflective liquid crystal panel, or a transmissive liquid crystal panel. Further, besides the liquid crystal panel or the DMD, any light modulation device capable of modulating the light emitted by the light source can be adopted without problems.

D5. Modified Example 5

It should be noted that the invention is not limited to the embodiments, specific examples, and the modified examples described above, but can be implemented with a variety of configurations within the scope or the spirit of the invention. For example, the technical features in the embodiments, the specific examples, and the modified examples corresponding to the technical features in the aspects described in SUMMARY section can appropriately be replaced or combined in order to solve all or a part of the problems described above, or in order to achieve all or a part of the advantages. Further, the technical feature can appropriately be eliminated unless described in the specification as an essential element.

What is claimed is:

1. A projector comprising:
   an image projector that displays a projection image, which is to be combined with a projection image of another projector, by projection on a projection surface;
   a controller that controls the image projector, and is adapted to transmit a control signal to the other projector for controlling projection of the other projector;
   an image capturer that captures the projection surface on which the projection image of the other projector is displayed, and generates a captured image; and
   an image corrector that corrects an image to be projected by the image projector based on the captured image,
   wherein the controller is adapted to:
   (i) transmit a control signal adapted to command projection of a reference image to the other projector,
   (ii) make the image capturer obtain the captured image including a taken image of the reference image, and
   (iii) make the image corrector perform the correction based on the captured image.

2. The projector according to claim 1, further comprising:
   an operation receiver adapted to receive an operation by a user,
   wherein in response to receiving the operation by the user, the controller controls the image projector in accordance with the operation by the user, and transmits the control signal corresponding to the operation by the user to the other projector.

3. The projector according to claim 1, wherein
   the image projector projects a second reference image,
   the reference image and second reference image both contain measurement point marks, and
   the measurement point marks in the reference image are different from the measurement point marks in the second reference image.

4. An image display system comprising:
   a first projector, including:
   a first image projector that displays a projection image by projection onto a common projection surface;
   a master controller that controls the first image projector;
   an image capturer that captures the common projection surface and generates a captured image; and an image corrector that corrects an image to be projected by the first image projector based on the captured image; and a second projector, including:

a second image projector that displays a second projection image on the common projection surface which is to be combined with the projection image projected by the first projector, based on an image signal; and a subordinate controller that controls the second image projector, wherein the master controller transmits a control signal to the second projector for controlling the projection of the second projector, and the subordinate controller receives the control signal from the first projector, controls the second image projector based on the control signal, and makes the second image projector project a reference image in response to receiving the control signal, and the master controller makes the image capturer take an image of the common projection surface on which the reference image is projected, and makes the image corrector perform the correction based on the captured image.

5. The image display system according to claim 4, wherein the first projector further includes an operation receiver adapted to receive an operation by a user, and in response to receiving the operation by the user via the operation receiver, the master controller controls the first image projector in accordance with the operation by the user, and transmits the control signal corresponding to the operation by the user to the second projector.

6. The image display system according to claim 5, wherein the operation receiver receives a correction instruction operation adapted to instruct a correction of the projection image and second projection image, which are formed on the common projection surface by the first and second projectors in cooperation with each other, from the user, and the control signal includes a correction command signal, which is transmitted in response to receiving the correction instruction operation.

7. The image display system according to claim 4, wherein the first image projector projects a second reference image, the reference image and second reference image both contain measurement point marks, and the measurement point marks in the reference image are different from the measurement point marks in the second reference image.

* * * * *